June 2, 1936.  C. E. PLOEGER  2,043,058
MAGNETIC UNLOADER
Filed Sept. 20, 1930  2 Sheets-Sheet 1
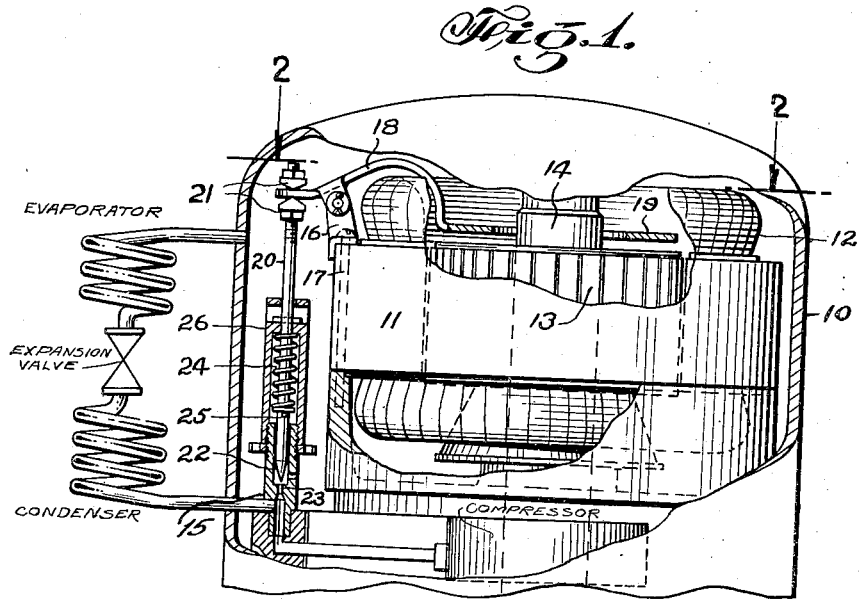
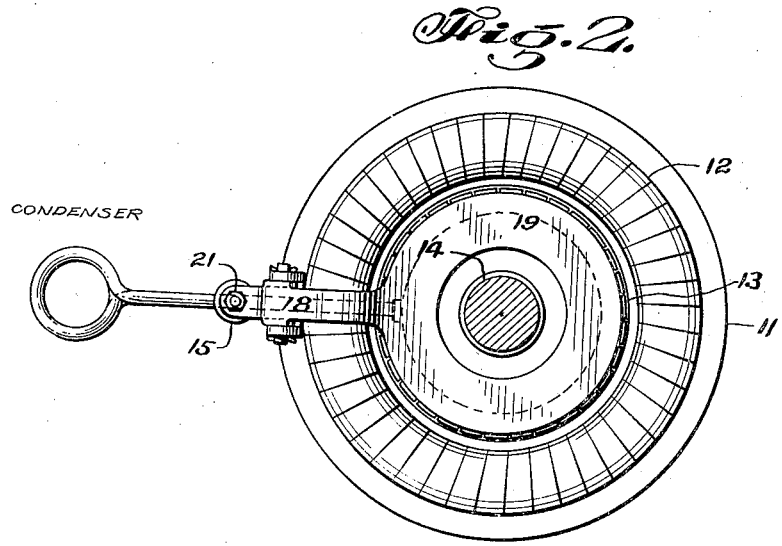
INVENTOR
CLYDE E. PLOEGER
BY
A. Yates Dowell
ATTORNEY June 2, 1936.                C. E. PLOEGER                2,043,058
                            MAGNETIC UNLOADER
                         Filed Sept. 20, 1930.           2 Sheets-Sheet 2
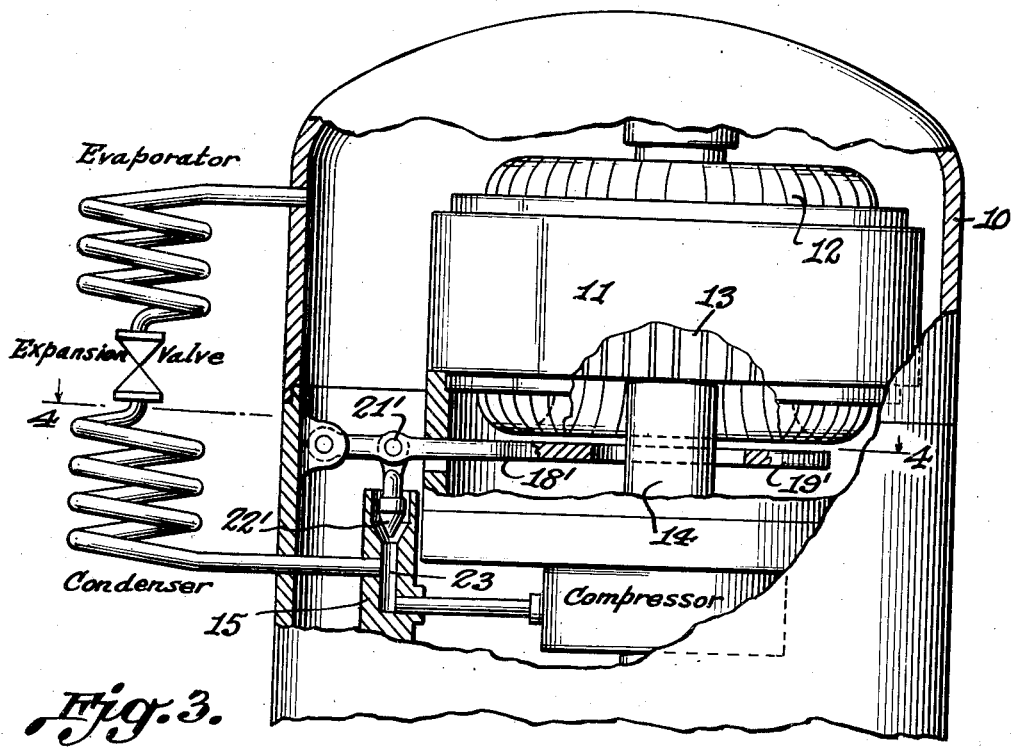
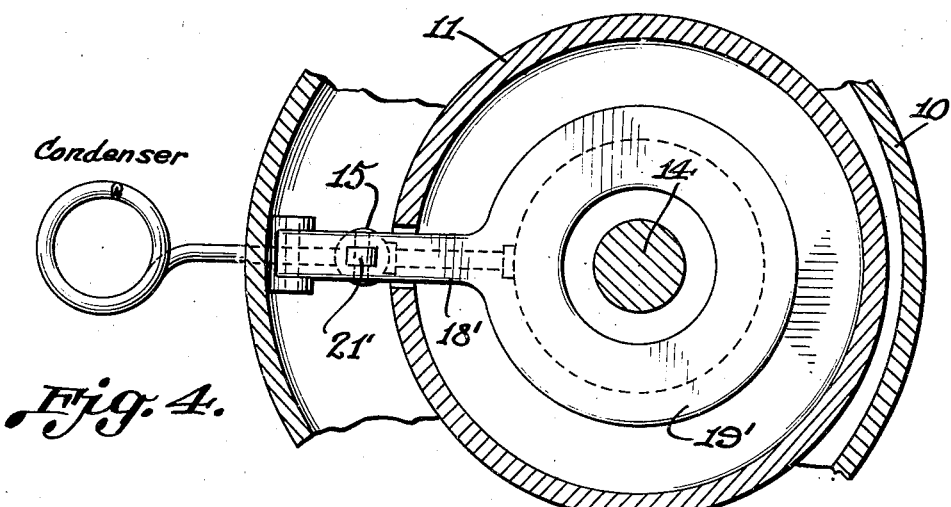

Patented June 2, 1936

2,043,058

UNITED STATES PATENT OFFICE 2,043,058

MAGNETIC UNLOADER

Clyde E. Ploeger, Evansville, Ind., assignor to Servel Inc., New York, N. Y., a corporation of Delaware Application September 20, 1930, Serial No. 483,148

26 Claims. (Cl. 62—4)

This invention relates to an unloader for electric motors, and particularly for electric motors for refrigerating systems of the compressor-condenser-expander type in which the compressor is driven by an electric motor and is provided with an unloading valve. More particularly this invention contemplates a means for operating the unloading valve to relieve the motor of any appreciable load at starting.

It is well known that the starting torque of an alternating-current motor is inherently small and it is ordinary practice to provide arrangements for relieving such a motor of its load during the starting period to avoid expensive design of the motor or the necessity of using a motor of larger size which decreases the total efficiency.

Heretofore it has been the practice to operate motor unloaders responsive to speed by means of centrifugal devices, responsive to the motor current by means of electro-magnetic devices, or, in the case of motor driven pumps, compressors, and the like, responsive to fluid pressure by pressure responsive devices. The present invention contemplates a device for operating a motor unloader to relieve the motor of its load until it has attained the requisite speed which is simple in construction and operation and is inexpensive to build and install and performs accurately without need of frequent adjustment or repair. Furthermore, my device is compact and can be incorporated with the motor as an inconspicuous part thereof. This is of particular value in refrigerating machines, especially the kind having an hermetically sealed casing around the compressor and motor, where space is at a premium and durability is a prime requisite.

It is well understood that when the primary circuit of an alternating-current motor is closed while the rotor is at a standstill excessive currents flow in both field and armature windings which cause a distortion of the magnetic flux which extends beyond the ends of the rotor and creates a magnetic leakage field. As the rotor comes up to speed the current in the windings decreases and the leakage flux diminishes. At the instant of starting, the leakage field is a maximum and as the rotor approaches synchronism the leakage field decreases. A device for operating an unloader is provided which includes a member of magnetic material which is adapted to be so positioned with respect to the motor that it is attracted by the leakage magnetic field to open the unloader at starting and is returned by some means such as a spring or gravity when the leakage field decreases to close the unloader.

My invention will be more fully understood upon reference to the following description taken in connection with the accompanying drawings in which some embodiments of the invention are illustrated.

In the drawings, in which like reference characters indicate like parts, there is illustrated a portion of a refrigerating machine showing the motor for driving the compressor, an unloading valve for the compressor, and an unloading valve operating means constructed in accordance with my invention.

In said drawings—

Fig. 1 is a fragmentary part elevational, part sectional view illustrating one application of the invention;

Fig. 2, a top plan view of the structure of Fig. 1 with the outer casing removed, Fig. 3, a fragmentary, part elevational, part sectional view of a device constructed in accordance with this invention and having an unloading valve normally closed by gravity, and Fig. 4, a section on line 4—4 of Fig. 3.

Referring to Figs. 1 and 2 of the drawings, a casing 10 encloses the motor compressor unit of a refrigerator which may be of the hermetically sealed type. The motor, which comprises a frame 11, field windings 12 and rotor 13, is connected to drive a compressor of conventional construction through a shaft 14. An unloading valve 15 is provided to relieve the compressor and, threfore, the motor of its load at starting in the usual manner.

A bracket 16 is secured to the motor frame 11 by stud bolts 17. Pivoted on this bracket is a lever 18 which curves over the stator or field winding 12 and terminates in a flat ring or annulus 19 of magnetic material which is disposed concentrically around the shaft 14 and adjacent the rotor 13. The opposite end of the lever 18 is connected to the stem 20 of the unloading valve 15 between two adjusting nuts 21.

The valve stem 20 terminates in a tapered portion 22 which is normally held in its seated position to close port 23 by a spring 24 around the valve stem 20 which is maintained under compression between a member such as a pin 25 on the stem and the upper casing 26 of the unloader valve.

In operation, the magnetic field of the motor is greatly distorted at the instant of starting as above described and consequently the magnetic member 19 which lies adjacent the rotor of the motor will be attracted and move the lever 18 and thereby the valve stem 20 against the action of spring 24 to open the unloading valve 15, thus relieving the load on the compressor. Magnetic member 19 will remain in attracted position until the leakage flux of the motor has decreased to such an extent that the force of the spring 24 is sufficient to overcome the magnetic attraction on the member 19 and close the unloading valve 15, thus putting the compressor load on the motor. The position of the magnetic member 19 with respect to the rotor 13 may be varied by adjusting nuts 21 on the valve stem 20 and the spring 24 can be given such a tension that the unloading valve will be closed when the motor reaches the speed at which it will have developed sufficient torque to drive the compressor under load.

In Fig. 3 is shown diagrammatically a refrigerating system including a compressor, a condenser, an expansion valve and an evaporator. In normal operation the compressor forces refrigerant gas under pressure into the condenser where it is cooled and condensed or liquefied. From the condenser the liquid passes through some sort of conventional flow control means, as for example an expansion valve into an evaporator coil where heat is absorbed by the change in state from a liquid to a gas.

The gas is sucked from the evaporator back into the motor compressor chamber within the casing 10 which is on the low or suction side of the system.

As previously described, this invention is for means for relieving a motor driving a compressor of its load at starting, such compressor being driven by a motor consisting of stator 12 and rotor 13 on shaft 14. In the line from the compressor to the condenser is disposed a valve casing 15 provided with a passage 23 open to the inside of the casing, communication directly between the valve casing and the casing 10 being controlled by a valve 22' pivoted at 21' on a lever 18' fulcrumed upon the casing. The lever 18' is provided with an annulus 19'. In this construction the operation is the same as that previously described except that the unloader valve is normally held closed by gravity.

It will be obvious to those skilled in the art that various other changes may be made in the construction and arrangement without departing from the spirit of my invention and therefore I do not limit myself to what is shown in the drawings and described in the specification but only as indicated in the appended claims.

I claim:

1. The combination of a compressor, an unloading valve for said compressor, an electric motor for operating said compressor, a lever pivoted on said motor and having one end overlying the rotor within the leakage magnetic field of said motor and adapted to be attracted upon starting of the motor, and means connected to the other end of the lever adapted to operate the unloading valve of the compressor.

2. In a refrigerating system of the compressor-condenser-expander type, an electric motor for driving the compressor, and an unloading device for the compressor operable by the magnetic leakage flux of the motor.

3. In a refrigerating system, a compressor, an electric motor for driving said compressor, an unloading valve for the compressor and a mechanical device having a magnetic member directly affected by the strength of the magnetic leakage field of said electric motor for operating said unloading valve.

4. In a refrigerating system including a compressor, an electric motor for driving said compressor, and an unloading valve for the compressor; means for operating said unloading valve including a pivoted lever connected at one point to operate the unloading valve and at another point to a member of magnetic material positioned so as to be influenced by the magnetic leakage field of said electric motor.

5. In a refrigerating system including a compressor, an electric motor for driving said compressor, and an unloading valve for the compressor; means for operating said unloading valve including a pivoted lever connected at one point to operate the unloading valve and at another point to an annular member of magnetic material which is positioned concentrically with and adjacent to but beyond the end of the rotor of the electric motor.

6. A compressor, an electric motor for driving said compressor, an unloading valve for said compressor, and a device for controlling said unloading valve responsive to the strength of the magnetic leakage field of the motor driving said compressor, said device comprising a lever pivoted intermediate its ends adapted to be connected at one end to the unloading valve and at the other end to an annular plate of magnetic material, said plate adapted to be positioned concentrically with and adjacent to but beyond the end of the rotor of said motor.

7. In a refrigerating system, a compressor, an electric motor for driving said compressor, an unloader for the compressor, a member of magnetic material movable within the magnetic leakage field of said motor, and mechanical linkage operatively connecting said member and unloader.

8. In combination a compressor, an electric motor for driving said compressor, an unloading valve for said compressor, a member of magnetic material movable within the magnetic leakage field of said motor, and mechanical linkage operatively connecting said member and valve.

9. In combination a compressor, an electric motor for driving said compressor, an unloading valve for said compressor, and a member of magnetic material movable within the magnetic leakage field of said motor mechanically connected for operation of said valve.

10. In a refrigerating device, a refrigerant circulatory system including a heat exchange element, a condenser, and a compressor, an electric motor for driving said compressor, means for substantially reducing the pressure of the high pressure side of the system upon starting said motor, said means being actuated by the increased magnetic field around the motor set up by the starting current.

11. In a refrigerating device, a refrigerant circulatory system including a heat exchange element, a condenser, and a compressor, an electric motor for driving said compressor, a connection from the high pressure side of said compressor to the low pressure side thereof, a valve in said connection, and means responsive to the increased magnetic field around the motor set up by the starting current for controlling said valve.

12. In a refrigerating device, a refrigerant circulatory system including a heat exchange element, a condenser, and a compressor, an electric motor for driving said compressor, a connection from the high pressure side of the compressor to the low pressure side thereof, a valve in said connection, an actuating member of magnetic material for said valve disposed adjacent the stator of said motor in position to be affected by the magnetic field emanating therefrom.

13. In a refrigerating device, a refrigerant circulatory system including a heat exchange element, a condenser, and a compressor, an electric motor for driving said compressor, a connection from the high pressure side of the compressor to the low pressure side thereof, a valve in said connection, a pivoted actuating member of magnetic material for said valve disposed adjacent the stator of said motor in position to be affected by the magnetic field emanating therefrom.

14. In a refrigerating device, a refrigerant circulatory system including a heat exchange element, a condenser, and a compressor, an electric motor for driving said compressor, a connection from the high pressure side of the compressor to the low pressure side thereof, a valve in said connection, an actuating member of magnetic material for said valve pivoted to the motor support disposed adjacent the stator of said motor in position to be affected by the magnetic field emanating therefrom.

15. In a refrigerating device, a refrigerant circulatory system including a heat exchange element, a condenser, and a compressor, an electric motor for driving said compressor, a casing for hermetically sealing said motor and compressor, a connection from the high pressure side of said compressor to the suction side thereof, a valve in said connection, an actuating member for said valve disposed within said casing in proximity to the stator of said motor in position to be influenced by the magnetic field emanating from said stator, said actuating member being arranged to normally close said valve and to open said valve upon abnormal fields caused by starting currents flowing through said stator.

16. The combination with an electric motor, a member to be driven, and means connecting said member to said motor whereby a load is imposed on the motor, of an unloader for said motor, and a device for operating said unloader comprising a pivoted lever operatively connected to the unloader and composed in part of magnetic material, said part being disposed within the magnetic leakage field of the motor.

17. The combination with an electric motor, a member to be driven, and means connecting said member to said motor whereby a load is imposed on the motor, of an unloading device for said motor, and a pivoted lever having one end within the magnetic leakage field of the motor adapted to be attracted upon starting of the motor and the other end operatively connected to said unloading device.

18. The combination with an electric motor, a member to be driven, and means connecting said member to said motor whereby a load is imposed on the motor, of an unloading device for said motor, and a member of magnetic material movable within the magnetic leakage field of said motor and mechanically connected to operate said device.

19. The combination with an electric motor, a member to be driven, and means connecting said member to said motor whereby a load is imposed on the motor, of an unloader for said motor operable responsive to an increase in strength of the magnetic leakage field of said motor acting in opposition to the force of gravity.

20. The combination with an electric motor, a member to be driven, and means connecting said member to said motor whereby a load is imposed on the motor, of an unloader for said motor having an actuating member of magnetic material located so as to be attracted upon increase in strength of the magnetic leakage field of said motor in opposition to the force of gravity.

21. In combination with a compressor driven by an electric motor, an unloading valve for said compressor, and means for actuating said valve comprising a member of magnetic material so located as to be attracted upon increase in strength of the magnetic leakage field of said motor in opposition to the force of gravity.

22. In a refrigeration system of the compressor type, a compressor, an electric motor for driving said compressor, an unloading valve for said compressor, and actuating means for said valve operable upon an increase in strength of the magnetic leakage field of said motor acting in opposition to the force of gravity.

23. A compressor, an electric motor for driving said compressor, an unloader for said compressor, a device for operating said unloader responsive to the strength of the magnetic leakage field of the motor, said device comprising a pivoted lever operably connected at one point to the unloader and composed in part of an annulus of magnetic material within the leakage magnetic field of the motor.

24. For use with a compressor and an electric motor for driving said compressor, means to unload said compressor, an initiating member of magnetic material adapted to be disposed in the leakage field of said motor and to be influenced thereby, and means whereby the initiating member actuates the unloading means in response to leakage field variations.

25. For use with a compressor and an electric motor for driving said compressor, means including a valve for unloading said compressor, an initiating member of magnetic material adapted to be disposed in the leakage field of said motor and to be influenced thereby, and means whereby the initiating member causes movement of said valve to unload and load the compressor in response to leakage field variations.

26. For use with an electric motor and a member driven thereby, means to unload the same, an initiating member of magnetic material adapted to be disposed in the leakage field of said motor and to be influenced thereby, and means whereby the initiating member actuates the unloading means in response to leakage field variations.

CLYDE E. PLOEGER.